United States Patent
Yamamoto

(10) Patent No.: US 11,820,886 B2
(45) Date of Patent: Nov. 21, 2023

(54) RESIN COMPOSITION, ADHESIVE MEMBER, AND DISPLAY DEVICE INCLUDING THE SAME

(71) Applicant: Samsung Display Co., Ltd., Yongin-si (KR)

(72) Inventor: Katsuhiro Yamamoto, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 72 days.

(21) Appl. No.: 17/406,526

(22) Filed: Aug. 19, 2021

(65) Prior Publication Data
US 2022/0135785 A1 May 5, 2022

(30) Foreign Application Priority Data
Oct. 29, 2020 (KR) .................. 10-2020-0142153

(51) Int. Cl.
| | |
|---|---|
| C08F 2/46 | (2006.01) |
| C08F 2/50 | (2006.01) |
| C08G 61/04 | (2006.01) |
| C08L 33/14 | (2006.01) |
| C08F 220/34 | (2006.01) |
| C08F 2/48 | (2006.01) |
| C08F 220/06 | (2006.01) |
| G09F 9/30 | (2006.01) |
| C09J 143/02 | (2006.01) |
| C08F 230/02 | (2006.01) |
| C08L 43/02 | (2006.01) |
| C09J 133/14 | (2006.01) |

(52) U.S. Cl.
CPC .............. *C08L 33/14* (2013.01); *C08F 2/48* (2013.01); *C08F 220/06* (2013.01); *C08F 220/343* (2020.02); *C08F 230/02* (2013.01); *C08L 43/02* (2013.01); *C09J 133/14* (2013.01); *C09J 143/02* (2013.01); *G09F 9/301* (2013.01)

(58) Field of Classification Search
CPC ........ C08L 43/02; C08L 33/14; C08F 220/06; C08F 220/343; C08F 2/48; C08F 230/02; G09F 9/301; C09J 143/02; C09J 133/14

USPC .......... 522/96, 90, 1, 6, 71, 189, 184; 520/1
See application file for complete search history.

(56) References Cited

U.S. PATENT DOCUMENTS

| | | | |
|---|---|---|---|
| 10,585,526 B2 | 3/2020 | Kim et al. | |
| 10,669,366 B2 | 6/2020 | Lee et al. | |
| 2013/0011683 A1 | 1/2013 | Busman et al. | |
| 2018/0126706 A1 | 5/2018 | Erdogan-Haug et al. | |
| 2019/0062608 A1 | 2/2019 | Aloshyna Ep Lesuffleur et al. | |

FOREIGN PATENT DOCUMENTS

| | | | |
|---|---|---|---|
| JP | 2003138234 | * | 5/2003 |
| JP | 2012-237965 | | 12/2012 |
| JP | 2016-129017 | | 7/2016 |
| JP | 2017-210578 | | 11/2017 |
| JP | 2018-524423 | | 8/2018 |
| JP | 2018-524425 | | 8/2018 |
| JP | 6718685 | | 7/2020 |
| KR | 10-2013-0040683 | | 4/2013 |
| KR | 10-1887993 | | 8/2018 |
| WO | 2016/196460 | | 12/2016 |
| WO | 2016/196576 | | 12/2016 |

OTHER PUBLICATIONS

Matsunami et al, JP 2003-138234 Machine Translation, May 14, 2003 (Year: 2003).*

* cited by examiner

*Primary Examiner* — Jessica Whiteley
(74) *Attorney, Agent, or Firm* — KILE PARK REED & HOUTTEMAN PLLC

(57) ABSTRACT

A resin composition includes a urethane (meth)acrylate oligomer. When the resin composition is cured with an ultraviolet light and loaded a shear force of about 2,000 Pa, the difference between the shear strain of the cured resin composition about 5 seconds after the loading and a shear strain of the cured resin composition about 300 seconds after the loading is less than about 5% A shear strain of the cured resin composition about 30 seconds after the shear force is removed from the cured resin composition is less than about 2%.

20 Claims, 11 Drawing Sheets

RESIN COMPOSITION, ADHESIVE MEMBER, AND DISPLAY DEVICE INCLUDING THE SAME

CROSS-REFERENCE TO RELATED APPLICATION(S)

This application claims priority to and benefits of Korean Patent Application No. 10-2020-0142153 under 35 U.S.C. § 119, filed on Oct. 29, 2020 in the Korean Intellectual Property Office, the entire contents of which are incorporated herein by reference.

BACKGROUND

1. Technical Field

The disclosure herein relates to a resin composition, an adhesive member formed of the resin composition, and a display device including the adhesive member.

2. Description of the Related Art

Display devices have been developed for use in multimedia devices such as televisions, mobile phones, tablet computers, navigation systems, and game consoles. In particular, display devices, which include flexible display modules that are bendable and capable of folding, bending and rolling, have been developed to facilitate portability and improve user convenience.

Such flexible display devices provide reliable folding and bending operations of each of the members. An adhesive resin with appropriate coating properties may be used to form the adhesive layers applied to display devices having various shapes.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition that may have improved applicability and may have a low storage modulus and a high elastic resilience after curing, and an adhesive member prepared from the resin composition.

The disclosure also provides a display device which includes an adhesive member with a low storage modulus and high elastic resilience properties, and thus exhibits improved reliability while the display device is operated, for example, when the display device is folded.

An embodiment provides a resin composition that may include urethane (meth)acrylate oligomer. When the resin composition is cured with an ultraviolet light and loaded with a shear force of about 2,000 Pa, a difference between a shear strain of the cured resin composition about 5 seconds after the loading and a shear strain of the cured resin composition about 300 seconds after the loading may be less than about 5%. A shear strain of the cured resin composition about 30 seconds after the shear force is removed from the cured resin composition may be less than about 2%.

In an embodiment, the resin composition may have a viscosity of about 20 mPa·s or less at about 30° C. to about 50° C.

In an embodiment, the shear strain of the cured resin composition about 5 seconds after the loading may be less than about 20%.

In an embodiment, the urethane (meth)acrylate oligomer may be included in an amount of about 1 wt % to about 15 wt % with respect to the total amount of the resin composition.

In an embodiment, the cured resin composition may have a storage modulus at about 25° C. of about $1.0 \times 10^4$ Pa to about $1.0 \times 10^5$ Pa.

In an embodiment, the cured resin composition may have a storage modulus at about 60° C. such that a value of the storage modulus of the cured resin composition at about 25° C. divided by the storage modulus of the cured resin composition at about 60° C. is greater than or equal to 0.9 and less than or equal to 2.0.

In an embodiment, the urethane (meth)acrylate oligomer may have a molecular weight of about 10,000 or more.

In an embodiment, the resin composition may further include a bifunctional (meth)acrylate monomer, wherein the bifunctional (meth)acrylate monomer may be included in an amount of less than about 1 wt % with respect to the total amount of the resin composition.

In an embodiment, the resin composition may further include a phosphate ester-based (meth)acrylate monomer, wherein the phosphate ester-based (meth)acrylate monomer may be included in an amount of about 1 wt % to about 10 wt % with respect to the total amount of the resin composition.

In an embodiment, the resin composition may further include an organic solvent, wherein the organic solvent may be included in an amount of less than about 1 wt % with respect to the total amount of the resin composition.

In an embodiment, an adhesive member may include a polymer derived from a resin composition including a urethane (meth)acrylate oligomer and having a viscosity of about 20 mPa·s or less at about 30° C. to about 50° C. When the adhesive member is loaded with a shear force of about 2,000 Pa, a difference between a shear strain of the adhesive member about 5 seconds after the loading and a shear strain of the adhesive member about 300 seconds after the loading may be less than about 5%. A shear strain of the adhesive member about 30 seconds after the shear force is removed from the adhesive member may be less than about 2%.

In an embodiment, the resin composition may include a bifunctional (meth)acrylate monomer or a phosphate ester-based (meth)acrylate monomer.

In an embodiment, the shear strain of the adhesive member about 5 seconds after the loading may be less than about 20%.

In an embodiment, a display device may include a display panel, a window disposed on the display panel, and an adhesive member disposed between the display panel and the window. The adhesive member may be derived from a resin composition including a urethane (meth)acrylate oligomer, and when the adhesive member is loaded with a shear force of about 2,000 Pa, a difference between a shear strain of the adhesive member about 5 seconds after the loading and a shear strain of the adhesive member about 300 seconds after the loading may be less than about 5%. A shear strain of the adhesive member about 30 seconds after the shear force is removed from the adhesive member may be less than about 2%.

In an embodiment, the adhesive member may have a thickness of about 50 μm to about 200 μm.

In an embodiment, the display device may further include an input sensor disposed on the display panel. The adhesive member may be disposed between the display panel and the input sensor or may be disposed between the input sensor and the window.

In an embodiment, the display panel may include a display element layer and an encapsulation layer disposed on the display element layer. The input sensor may be disposed on the encapsulation layer, and the adhesive member may be disposed on the input sensor.

In an embodiment, the adhesive member may be formed by curing the resin composition on a surface of the window or on a surface of the display panel.

In an embodiment, the display device may include at least one folding area, and the at least one folding area may have a radius of curvature of about 5 mm or less.

In an embodiment, the display device may further include a light control layer disposed between the adhesive member and the window, and an optical adhesive layer disposed between the light control layer and the window. The optical adhesive layer may include a polymer derived from the resin composition.

BRIEF DESCRIPTION OF THE DRAWINGS

The accompanying drawings are included to provide a further understanding of the embodiments, and are incorporated in and constitute a part of this specification. The drawings illustrate embodiments and, together with the description, serve to explain principles of the embodiments. The above and other aspects and features of the disclosure will become more apparent by describing in detail embodiments thereof with reference to the attached drawings, in which.

DETAILED DESCRIPTION OF THE EMBODIMENTS

Figure 1:
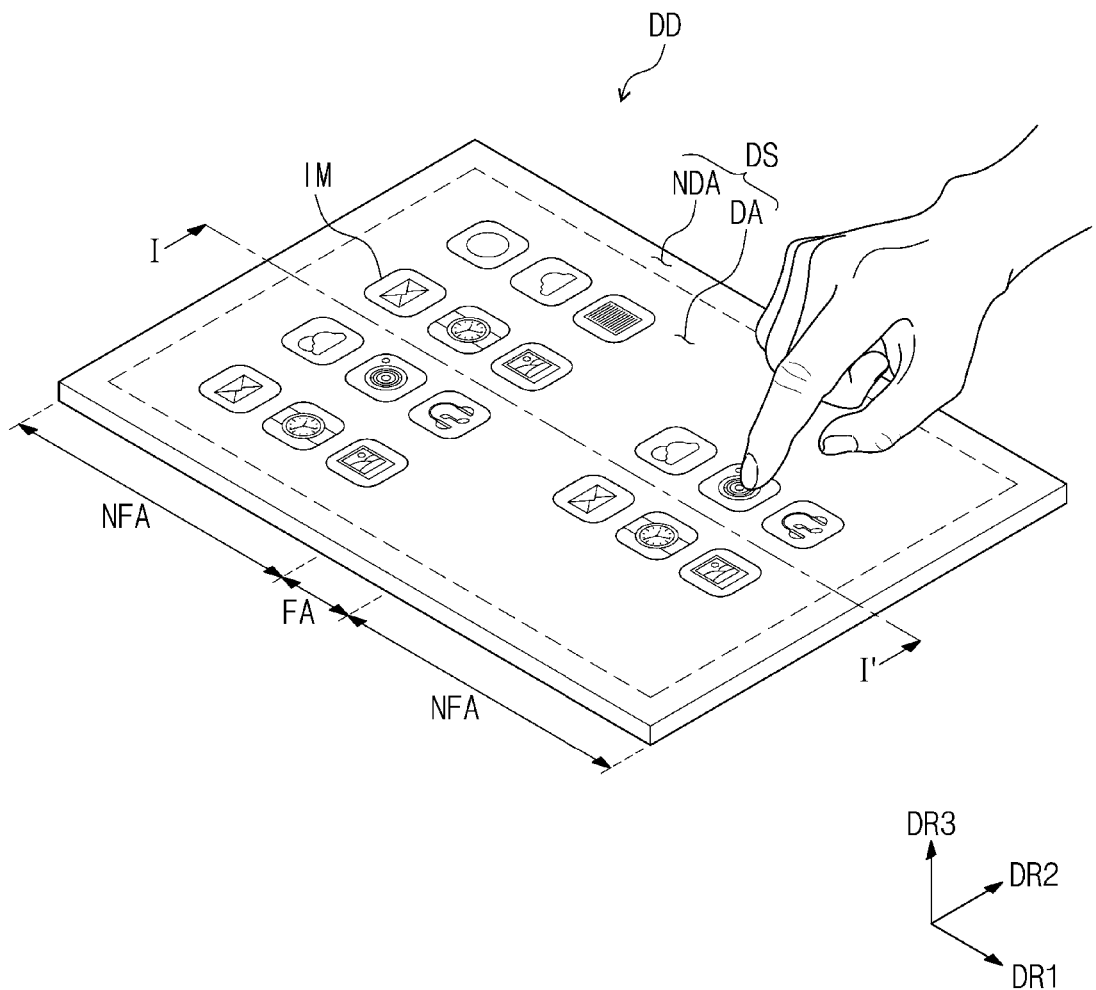
FIG. 1 is a schematic perspective view of a display device according to an embodiment.

The embodiments may be implemented in various modifications and have various forms and specific embodiments are illustrated in the drawings and described in detail in the text. It is to be understood, however, that the embodiments are not intended to be limited to the particular forms disclosed, but on the contrary, is intended to cover all modifications, equivalents, and alternatives falling within the spirit and scope of the disclosure.

In this specification, it will be understood that when an element or layer is referred to as being "on", "connected to" or "coupled to" another element or layer, it can be directly on, connected or coupled to the other element or layer or intervening elements or layers may be present.

On the other hand, in the application, "directly disposed" means that there is no layer, film, region, plate, or the like added between the portion of the layer, film, region, for example, "directly disposed" may mean disposing without additional members such as adhesive members between two layers or two members.

Like numbers refer to like elements throughout. The thickness and the ratio and the dimension of the element are exaggerated for effective description of the technical contents.

As used herein, the term "and/or" includes any and all combinations of one or more of the associated listed items.

It will be understood that, although the terms first, second, and the like may be used herein to describe various components, these components should not be limited by these terms. These terms are only used to distinguish one component from another component. Thus, a first component discussed below could be termed a second component without departing from the teachings of the disclosure, and similarly, the second component could also be termed to as the first component. As used herein, the singular forms are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. The terms are relative concepts and are described based on the directions indicated in the drawings. In this specification, the term "below" can encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more features, integers, steps, operations, elements, components, and/or groups thereof.

Hereinafter, a resin composition, an adhesive member, and a display device according to the embodiments will be described with reference to the accompanying drawings.

Hereinafter, the embodiments will be described in detail with reference to the accompanying drawings.

Figure 2:
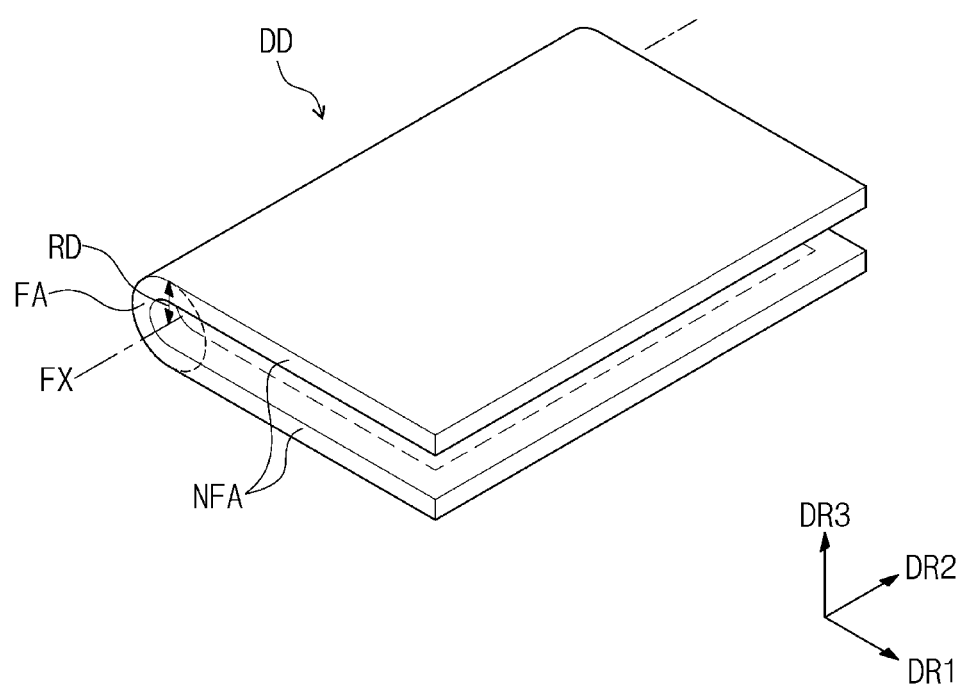
FIG. 2 schematically illustrates a folding state of the display device illustrated in FIG. 1.

FIG. 1 is a schematic perspective view of a display device according to an embodiment. FIG. 2 is a diagram schematically illustrating a folding state of the display device illustrated in FIG. 1

Referring to FIG. 1, a display device DD according to an embodiment may have a rectangular shape having long sides extending in a direction of a first directional axis DR1, and short sides extending in a direction of a second directional axis DR2 intersecting the first directional axis DR1. However, the embodiments are not limited thereto, and the display device DD may have various shapes such as a circular shape and a polygonal shape. The display device DD may be a flexible display device.

In the display device DD according to an embodiment, a display surface DS on which an image IM is displayed may be parallel to a plane defined by the first directional axis DR1 and the second directional axis DR2. A third directional axis DR3 indicates the normal direction of the display surface DS, for example, the thickness direction of the display device DD. The front surface (or upper surface) and the rear surface (or lower surface) of each member are defined by the third directional axis DR3. However, the directions indicated by the first to third directional axes DR1, DR2, and DR3 are relative concepts and may thus be converted to other directions. Hereinafter, the first to third directions are respectively indicated by the first to third directional axes DR1, DR2, and DR3, and are thus denoted by the same reference numerals.

The display device DD according to an embodiment may include at least one folding area FA. Referring to FIGS. 1 and 2, the display device DD may include a folding area FA and non-folding areas NFA. The folding area FA may be disposed between the non-folding areas NFA, and the folding area FA and the non-folding areas NFA may be arranged adjacent to each other in the direction of the first directional axis DR1.

The folding area FA may be a part deformable in a folded shape with respect to a folding axis FX extending in the direction of the second directional axis DR2 which is one direction. The radius of curvature RD of the folding area FA may be about 5 mm or less.

FIGS. 1 and 2 illustrate one folding area FA and two non-folding area NFA, but number of folding areas FA and number of non-folding areas NFA are not limited thereto. For example, the display device DD may include more than two non-folding areas NFA and folding areas FA disposed between the non-folding areas NFA.

In the display device DD according to an embodiment, the non-folding areas NFA may be disposed to be symmetrical to each other with respect to the folding area FA. However, the embodiments are not limited thereto. The folding area FA may be disposed between the non-folding areas NFA such that the areas of the two non-folding areas NFA facing each other with respect to the folding area FA may be different from each other.

The display surface DS of the display device DD may include a display area DA and a non-display area NDA around the display area DA. The display area DA may display an image, and the non-display area NDA may not display an image. The non-display area NDA may surround the display area DA and may define the border of the display device DD.

Referring to FIG. 2, the display device DD may be bendable (foldable) display device DD that is folded or unfolded. For example, the folding area FA is bent with respect to the folding axis FX parallel to the second directional axis DR2, so that the display device DD may be folded. The folding axis FX may be defined as a short axis parallel to the short side of the display device DD.

In case that the display device DD is folded, non-folding areas NFA may face each other, and the display device DD may be in-folded so that the display surface DS is not exposed to the outside. However, the embodiments are not limited thereto. Unlike the illustration in the drawing, the display device DD may be out-folded so that the display surface DS is exposed to the outside.

Figure 3:
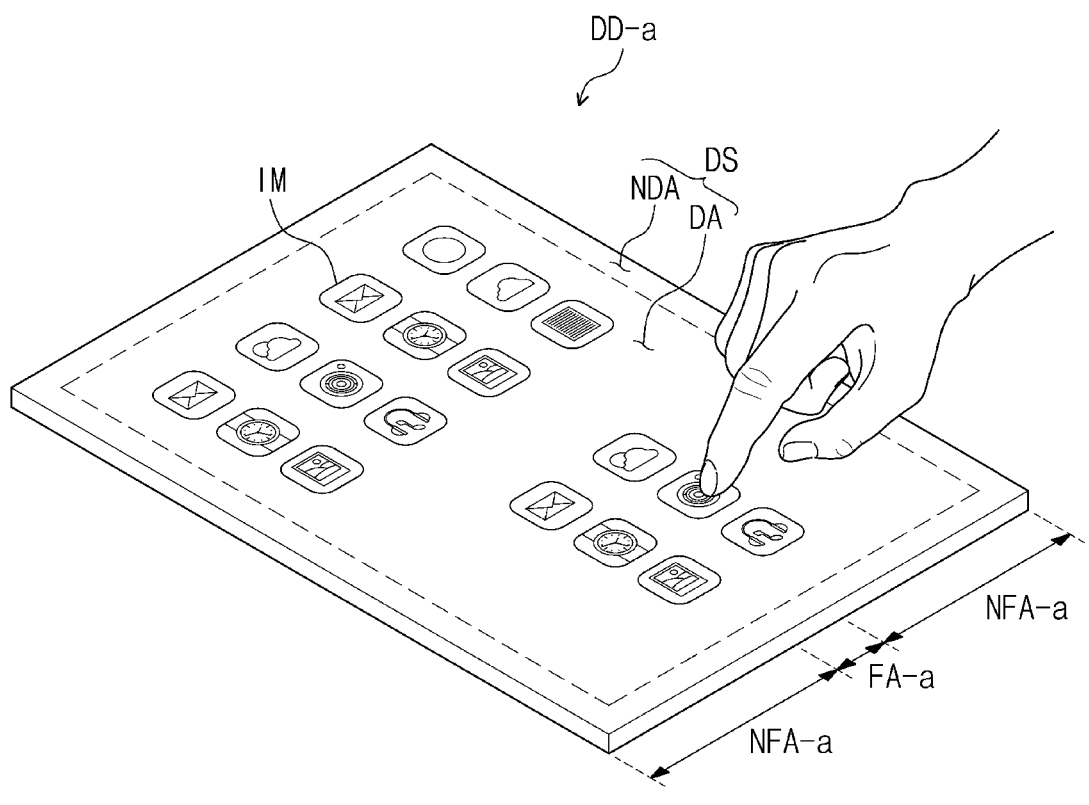
FIG. 3 is a schematic perspective view of a display device according to an embodiment.
Figure 4:
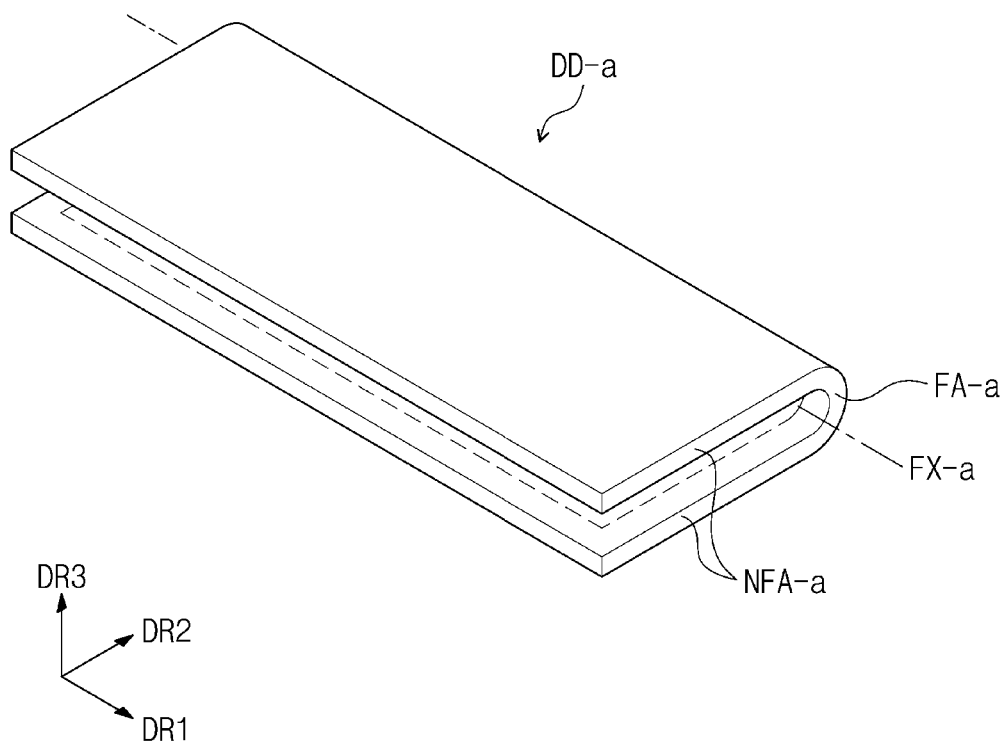
FIG. 4 schematically illustrates a folding state of the display device illustrated in FIG. 3.

FIG. 3 is a schematic perspective view of a display device according to an embodiment. FIG. 4 is a diagram schematically illustrating a folding state of the display device illustrated in FIG. 3.

Except for the folding operation, a display device DD-a illustrated in FIG. 3 may have substantially the same configuration as the display device DD illustrated in FIG. 1. Accordingly, hereinafter, the display device DD-a illustrated in FIG. 3 and FIG. 4 will be described focusing on folding operations.

Referring to FIGS. 3 and 4, the display device DD-a may include a folding area FA-a and non-folding areas NFA-a. The folding area FA-a may be disposed between the non-folding areas NFA-a, and the folding area FA-a and the non-folding areas NFA-a may be arranged adjacent to each other in the direction of the second directional axis DR2.

The folding area FA-a may be bent with respect to the folding axis FX-a parallel to the first directional axis DR1, so that the display device DD-a may be folded. The folding axis FX-a may be defined as a long axis parallel to the long side of the display device DD-a. The display device DD illustrated in FIG. 1 is folded with respect to the short axis, but, on the contrary, the display device DD-a illustrated in FIG. 3 may be folded with respect to the long axis. FIG. 4 illustrates that the display device DD-a is in-folded so that the display surface DS is not exposed to the outside. However, the embodiments are not limited thereto, and the display device DD-a may be folded with respect to the long axis and out-folded.

Figure 5:
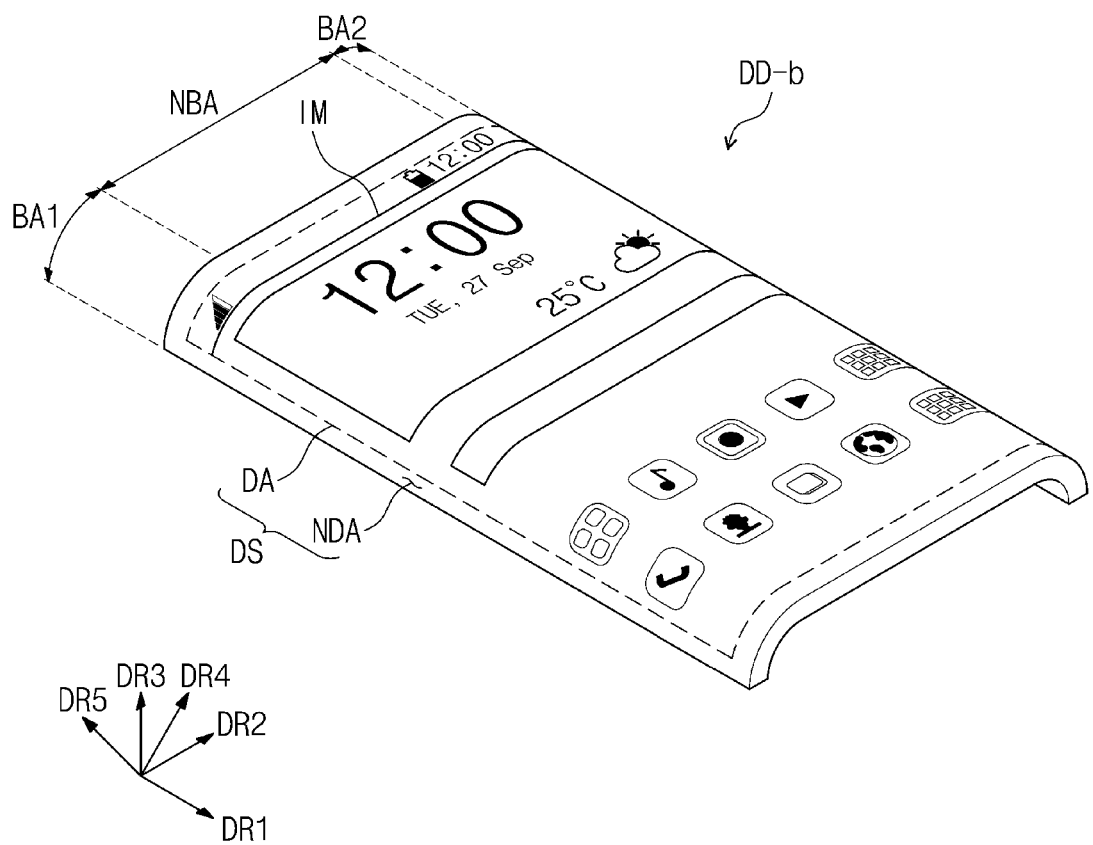
FIG. 5 is a schematic perspective view of a display device according to an embodiment.

FIG. 5 is a schematic perspective view of a display device according to an embodiment. A display device DD-b according to an embodiment may include bending areas BA1 and BA2 and a non-bending area NBA, and the bending areas BA1 and BA2 may be bent from one side of the non-bending area NBA.

Referring to FIG. 5, the display device DD-b according to an embodiment may include non-bending area NBA in which the image IM is displayed on a front surface, and a first bending area BA1 and a second bending area BA2 in which the image IM is displayed on side surfaces. The first bending area BA1 and the second bending area BA2 may be respectively bent from both sides of the non-bending area NBA.

Referring to FIG. 5, in the non-bending area NBA, the image IM may be provided in the direction of the third directional axis DR3, and provided on the front surface of the display device DD-b. The first bending area BA1 may be an area in which the image is provided in the direction of a fifth directional axis DR5, and the second bending area BA2 may be an area in which the image is provided in the direction of a fourth directional axis DR4. The fourth directional axis DR4 and the fifth directional axis DR5 may intersect the first to third directional axes DR1, DR2, and DR3. However, the directions indicated by the first to fifth directional axes DR1 to DR5 are relative concepts and are not limited to the directional relationship illustrated in the drawings.

The display device DD-b according to an embodiment may be a bendable display device including the non-bending area NBA and the bending areas BA1 and BA2 respectively disposed on both sides of the non-bending area NBA. Although not illustrated, the display device according to an embodiment may be a bendable display device including one non-bending area and one bending area. The bending area may be provided by being bent only at one side of the non-bending area.

In FIGS. 1 to 5 described above, a foldable display device and a bendable display device are illustrated and described, but the embodiments are not limited thereto. The display device of an embodiment may be a rollable display device, a flat rigid display device, or a curved rigid display device.

Hereinafter, in the description of the display device according to an embodiment, the display device DD that is folded with respect to the short axis is described, but the embodiments are not limited thereto. In addition, contents to be described later may be applied to various types of display devices as well as a display device DD-a that is folded with respect to the long axis and a display device DD-b including a bending area.

Figure 6:
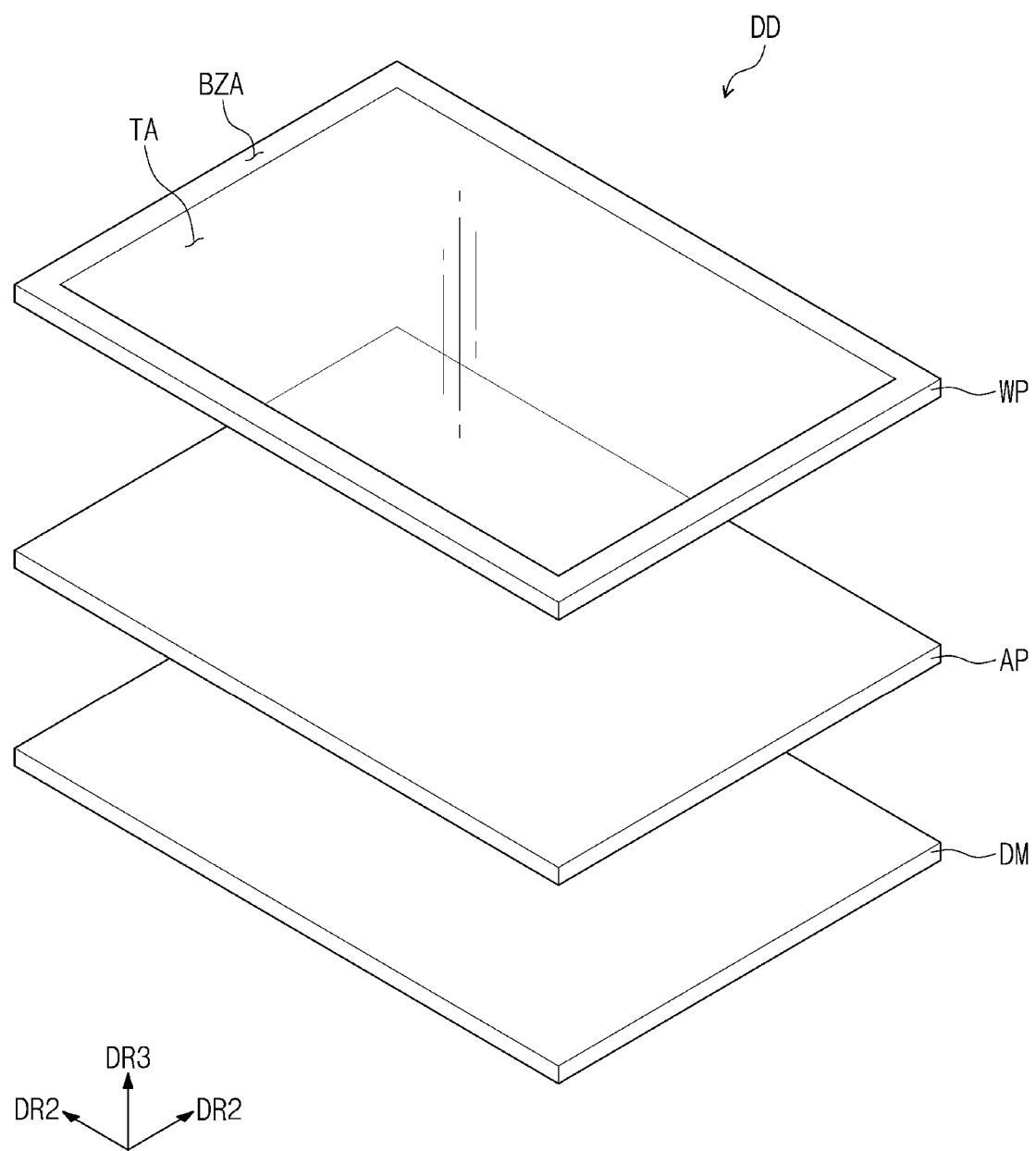
FIG. 6 is an exploded schematic perspective view of a display device according to an embodiment.
Figure 7:
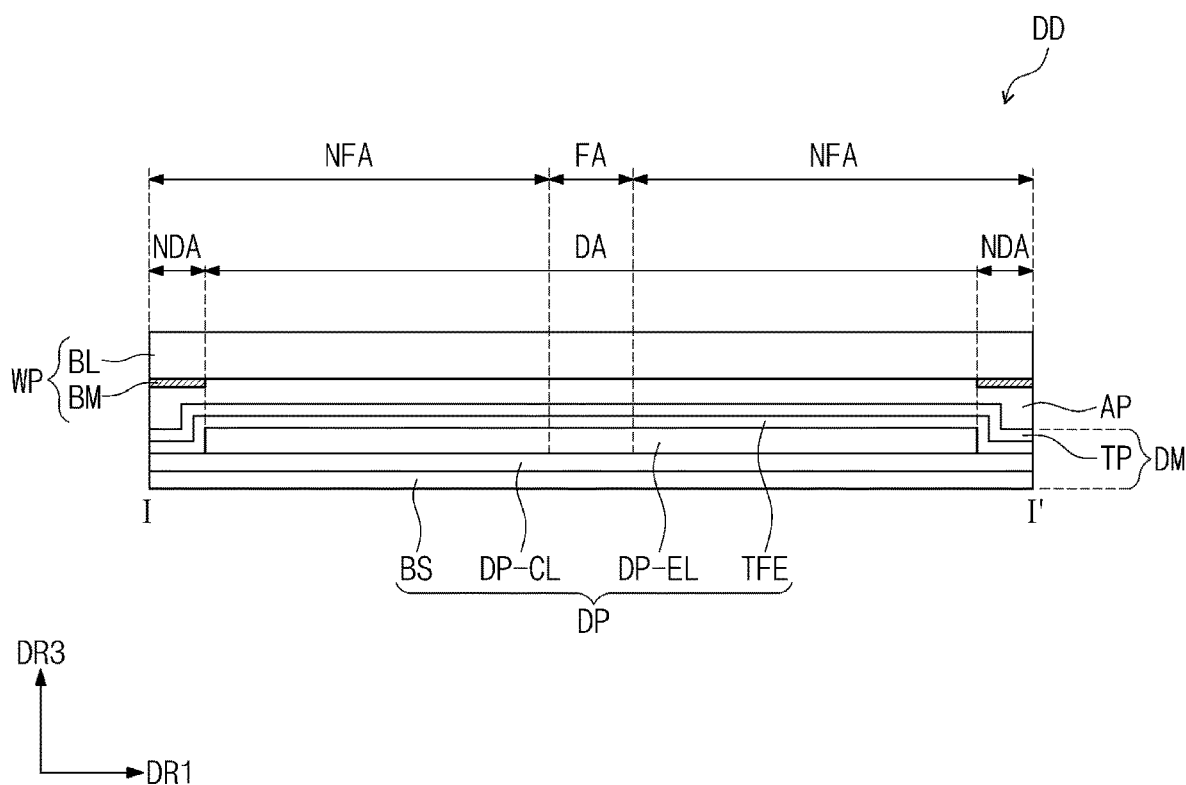
FIG. 7 is a schematic cross-sectional view of a display device according to an embodiment.

FIG. 6 is an exploded schematic perspective view of a display device DD according to an embodiment. FIG. 7 is a schematic cross-sectional view of the display device DD according to an embodiment. FIG. 7 may be a schematic cross-sectional view of a portion taken along line I-I' of FIG. 1.

The display device DD according to an embodiment may include a display module DM and a window WP disposed on the display module DM. In the display device DD of an embodiment, the display module DM may include a display panel DP including a display element layer DP-EL and an input sensor TP disposed on the display panel DP. The display device DD according to an embodiment may include an adhesive member AP disposed between the display panel DP and the window WP. For example, in the display device DD according to an embodiment, the adhesive member AP may be disposed between the input sensor TP and the window WP. The adhesive member AP may be an optically clear adhesive film (OCA) or an optically clear adhesive resin layer (OCR).

The adhesive member AP may be formed from the resin composition of an embodiment. The adhesive member AP may include a polymer derived from the resin composition of an embodiment.

The resin composition of an embodiment includes a urethane (meth)acrylate oligomer. In the specification, (meth)acrylate refers to acrylate or methacrylate. The resin composition of an embodiment may include a urethane (meth)acrylate oligomer having a weight average molecular weight (Mw) of about 10,000 or more. In the resin composition of an embodiment, the weight average molecular weight of the urethane (meth)acrylate oligomer may be about 27,000 to about 50,000.

In an embodiment, the urethane (meth)acrylate oligomer may include a photocurable compound including at least one (meth) acryloyl group having a urethane bond. The urethane (meth)acrylate oligomer may include at least one of acrylate with urethane bond, urethane acrylate with polycarbonate skeleton, and urethane acrylate with polyether skeleton. For example, the resin composition of an embodiment may include as a urethane acrylate oligomer at least one of UV-3700B (Mitsubishi Chemical Holdings), UN-5500 (Negami Chemical Industrial), UF-0051 (KYOEISHA CHEMICAL), KRM8792 (DAICEL-ALLNEX), and UN-6305 (Negami Chemical Industrial).

The resin composition including a urethane (meth)acrylate oligomer having a weight average molecular weight of about 10,000 or more may exhibit low-viscosity properties such that the resin composition may be applied through a method such as inkjet printing or dispensing application. The urethane (meth)acrylate oligomer having a weight average molecular weight of about 10,000 or more is included in the resin composition in an oligomer state having a relatively high degree of polymerization, and maintains a high degree of polymerization even after photocuring, thereby exhibiting a low storage modulus (G') value and high peel strength properties.

The resin composition of an embodiment may include about 1 wt % to about 15 wt % of a urethane (meth)acrylate oligomer with respect to the total resin composition. The resin composition of an embodiment includes about 1 wt % to about 15 wt % of the urethane (meth)acrylate oligomer having a weight average molecular weight of 10,000 or more, so that the resin composition exhibits low-viscosity properties having a viscosity of about 1.0 mPa·s to about 20 mPa·s in a resin state, and exhibits a high elastic resilience after photocuring. Accordingly, when the adhesive member formed of the resin composition of an embodiment is applied to a foldable display device, the folding characteristics of the display device may be improved.

The resin composition of an embodiment may further include at least one of a bifunctional (meth)acrylate monomer and a phosphate ester-based (meth)acrylate monomer. The resin composition of an embodiment may further include at least one photoinitiator.

In the resin composition of an embodiment, a bifunctional (meth)acrylate monomer means a (meth)acrylate monomer including two functional groups. More specifically, the bifunctional (meth)acrylate monomer means a (meth)acrylate monomer including two (meth)acryloyl groups in one molecule. In the resin composition of an embodiment, the bifunctional (meth)acrylate monomer may include different monomers. For example, the resin composition of an embodiment, bifunctional (meth)acrylate monomer may include at least one bifunctional acrylate monomer and at least one bifunctional methacrylate monomer.

The resin composition of an embodiment may include, as the bifunctional (meth)acrylate monomer, 1,4-butanediol di(meth)acrylate, 1,3-butylene glycol di(meth)acrylate, 1,6-hexanediol di(meth)acrylate, 1,8-octane diol di(meth)acrylate, 1,9-octane diol diacrylate, 1,12-dodecane diol di(meth)acrylate, neopentyl glycol di(meth)acrylate, dicyclopentanyl di(meth)acrylate, cyclohexane-1,4-dimethanol di(meth)acrylate, tricyclodecane di methanol (meth)diacrylate, dimethylol dicyclopentane di(meth)acrylate, neopentyl glycol modified trimethylpropane di(meth)acrylate, adamantane di(meth)acrylate, trimethylolpropane tri(meth)acrylate or a mixture thereof.

The resin composition of an embodiment may include the bifunctional (meth)acrylate monomer in an amount of less than about 1 wt % with respect to the total resin composition. The resin composition of an embodiment may include less than about 1 wt % of the bifunctional (meth)acrylate monomer, and therefore may exhibit low-viscosity properties having a viscosity of about 1.0 mPa·s to about 20 mPa·s in a resin state, and may exhibit a high elastic resilience after photocuring.

In the resin composition of an embodiment, a phosphate ester-based (meth)acrylate monomer is a (meth)acrylate monomer including an ester bond of a phosphoric acid and a hydroxy group. Since the resin composition of an embodiment may include a phosphate ester-based (meth)acrylate monomer, it is possible to provide a high elastic resilience of the adhesive member AP formed through the resin composition, and to provide a storage modulus optimized to apply the adhesive member AP to a flexible display device.

The resin composition of an embodiment may include, as the phosphate ester-based (meth)acrylate monomer, 2-(methacryloyloxy)ethyl phosphate (SR9050, Satomasa), tris[2-(methacryloyloxy)ethyl phosphate] (SR9051, Satomasa), tris[2-(acryloyloxy)ethyl phosphate] (SR9053, Satomasa), 2-hydroxyethyl methacrylate phosphate (KAYAMER PM-2, Nippon Kayaku Co.) or a mixture thereof.

The resin composition of an embodiment may include about 1 wt % to about 10 wt % of a phosphate ester-based (meth)acrylate monomer with respect to the total resin composition. The resin composition of an embodiment includes about 1 wt % to about 10 wt % of a phosphate ester-based (meth)acrylate monomer, so that the resin composition may exhibit low-viscosity properties having a viscosity of about 1.0 mPa·s to about 20 mPa·s in a resin state, and also exhibit high elastic resilience after photocuring.

The resin composition of an embodiment may include at least one photoinitiator. In case that multiple photoinitiators are included, different photoinitiators may be activated by ultraviolet light having different central wavelengths.

The photoinitiator may be any one selected from 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone), and 2-hydroxy-1-{4-[4-(2-hydroxy-2-methyl-propionyl)-benzyl]-phenyl}-2-methylpropan-1-one.

The photoinitiator may be any one selected from 2-methyl-1[4-(methylthio)phenyl]-2-morpholinopropan-1-one, 2-benzyl-2-dimethylamino-1-(4-morpholinophenyl)-butanone-1), 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, and bis(2,4-cyclopentadienyl)bis[2,6-difluoro-3-(1-pyrryl)phenyl] titanium(IV).

The resin composition of an embodiment may not include a separate organic solvent. In other embodiments, the resin composition of an embodiment may include an organic solvent, but the organic solvent may be included in an amount less than about 1 wt % with respect to the total resin composition. The resin composition of an embodiment does not include an organic solvent or includes less than about 1 wt % of an organic solvent, thereby improving processability of the resin composition.

Typical resin compositions use a polymer to provide the elastic resilience of an adhesive member formed through the resin compositions. However, an organic solvent is typically used with such polymers, and using the organic solvent causes processing difficulties, for example, in the removal of the organic solvent after curing. Since the resin composition in the embodiments may form an adhesive member having a high elastic resilience without the use of a polymer and an organic solvent, it is possible to form an adhesive member having a low elastic modulus and high elastic resilience properties while improving the processability in the state of the resin composition.

The resin composition of an embodiment may have a viscosity of about 20 mPa·s or less at about 30° C. to about 50° C. The resin composition of an embodiment may have a viscosity of about 1.0 mPa·s to about 20 mPa·s at about 30° C. to about 50° C. For example, the resin composition may have a viscosity of about 1.0 mPa·s to about 20 mPa·s at about 40° C. The viscosity of the resin composition was measured according to the JIS (Japanese Industrial Standard) Z8803 method.

When the viscosity of the resin composition of an embodiment is less than about 1.0 mPa·s, the viscosity is low, so that the resin composition solution provided for forming an adhesive member may flow excessively. Accordingly, it may be difficult to form a coating film having a uniform thickness using the resin composition. When the viscosity of the resin composition of an embodiment is more than about 20 mPa·s, it may be difficult to discharge the resin composition in an appropriate amount from the application device used to apply the resin composition.

The liquid resin composition may be cured by ultraviolet (UV) irradiation, and the cured resin composition after UV curing may have a storage modulus value of about $1.0 \times 10^4$ Pa·s to about $1.0 \times 10^5$ Pa·s at about 25° C. The liquid resin composition after UV curing may have a storage modulus at about 60° C. such that the value of the storage modulus of the cured resin composition at about 25° C. divided by the storage modulus at about 60° C. is greater than or equal to 0.9 and less than or equal to 2.0. The storage modulus at 25° C. and 60° C. may satisfy Expression 1 below.

$$0.9 \leq \text{storage modulus at } 25° \text{C./storage modulus at } 60° \text{C.} \leq 2.0. \quad \text{[Expression 1]}$$

The resin composition after UV curing may have a low storage modulus value at about 25° C., and the storage modulus at about 25° C. and the storage modulus at about 60° C. may have similar values satisfying Expression 1.

The liquid resin composition is cured by UV irradiation to form a film or thin film, and the resin composition formed after UV curing may have a 180° peel force value of about 15 N/inch or more with respect to the surface of a glass substrate.

The liquid resin composition cured by UV irradiation may have high elastic resilience. When the resin composition is cured with UV light and loaded with a shear force of about 2,000 Pa (the shear force is applied to the liquid resin composition cured by UV irradiation), the difference between a shear strain of the cured resin composition about 5 seconds after the loading and a shear strain of the cured resin composition about 300 seconds after the loading is less than about 5%. When the resin composition is cured with UV light and loaded with a shear force of about 2,000 Pa (the shear force is applied to the liquid resin composition after UV curing), the shear strain about 300 seconds after the loading may be (α−5) % to (α+5) % where the shear strain about 5 seconds after the loading is α %. In an embodiment, when the resin composition is cured with UV light and loaded with a shear force of about 2,000 Pa (the shear force is applied to the liquid resin composition after UV curing), the shear strain about 5 seconds after the loading and the shear strain about 300 seconds after the loading may be less than about 20%. In an embodiment, when the resin composition is cured with UV light and loaded with a shear force of about 2,000 Pa (the shear force is applied to the liquid resin composition after UV curing), the shear strain about 5 seconds after the loading may be about 9% to about 13%, and the shear strain about 300 seconds after the loading may be more than about 4% and less than about 18%. After the resin composition is cured with UV light and loaded with a shear force of about 2,000 Pa (the shear force is applied to the cured resin composition), according to an embodiment, a shear strain about 30 seconds after the shear force is removed from the adhesive member may be less than about 2%. After the resin composition is cured with UV light and loaded with a shear force of about 2,000 Pa (the shear force is applied to the cured resin composition), according to an embodiment, a shear strain about 30 seconds after the shear force is removed may be less than about 0.2%.

A display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include organic light emitting elements or quantum dot light emitting elements in the display element layer DP-EL.

FIG. 7 illustrates an example configuration of the display panel DP, however, the embodiments are not limited thereto. For example, the display panel DP may include a liquid crystal display element, and the encapsulation layer TFE may be omitted.

An input sensor TP may be disposed on the display panel DP. For example, the input sensor TP may be directly disposed on the encapsulation layer TFE of the display panel DP. The input sensor TP may detect an external input, convert the external input to an input signal, and provide the input signal to the display panel DP. For example, in the display device DD of an embodiment, the input sensor TP may be a touch sensor that detects a touch. The input sensor TP may recognize a user's direct touch, a user's indirect touch, an object's direct touch, or an object's indirect touch, and the like. The input sensor TP may detect at least one of the locations of a touch applied from the outside or the intensity (pressure) of the touch. The embodiments are not limited by the structure or material of input sensor TP, and the input sensor TP may have various structures and may be composed of various materials. The input sensor TP may include sensing electrodes (not shown) for sensing an external input. The sensing electrodes (not shown) may capacitively detect an external input. The display panel DP may receive an input signal from the input sensor TP and generate an image corresponding to the input signal.

The window WP may protect the display panel DP and the input sensor TP. The image IM generated by the display panel DP may pass through the window WP and be provided to the user. The window WP may provide a touch surface of the display device DD. In the display device DD including the folding area FA, the window WP may be a flexible window.

The window WP may include a base layer BL and a printing layer BM. The window WP may include a transmission area TA and a bezel area BZA. The front surface, of the window WP, including the transmission area TA and the bezel area BZA corresponds to the front surface of the display device DD.

The transmission area TA may be an optically transparent area. The bezel area BZA may be an area having a relatively low light transmittance compared to the transmission area TA. The bezel area BZA may have a color. The bezel area BZA may be adjacent to the transmission area TA and surround the transmission area TA. The bezel area BZA may define the shape of the transmission area TA. However, the embodiments are not limited thereto, and the bezel area BZA may be disposed adjacent to only one side of the transmission area TA, or a portion of the bezel area BZA may be omitted.

The base layer BL may be a glass or a plastic substrate. For example, a tempered glass substrate may be used for the base layer BL. In other examples, the base layer BL may be formed of a flexible polymer resin. For example, the base layer BL may be made of polyimide, polyacrylate, polymethylmethacrylate, polycarbonate, polyethylene naphthalate, polyvinylidene chloride, polyvinylidene difluoride, polystyrene, ethylene vinyl alcohol copolymer or a combination thereof. However, the embodiments are not limited thereto, and any suitable base layer BL of the window WP may be used.

The printing layer BM may be disposed on one surface of the base layer BL. In an embodiment, the printing layer BM may be provided on a lower surface of the base layer BL adjacent to the display module DM. The printing layer BM may be disposed in the edge area of the base layer BL. The printing layer BM may be an ink printing layer. The printing layer BM may be a layer including a pigment or dye. In the window WP, the bezel area BZA may be a portion provided with the printing layer BM.

The window WP may further include at least one functional layer (not shown) provided on the base layer BL. For example, the functional layer (not shown) may be a hard coating layer, an anti-fingerprint coating layer, or the like, but the embodiments are not limited thereto.

There may be a step between a portion of the base layer BL provided with the printing layer BM and the portion of the base layer BL not provided with the printing layer BM. The adhesive member AP of an embodiment formed from the resin composition described above has a low storage modulus and a high adhesion value, and may thus be attached to the window WP without being lifted at the stepped portion.

In an embodiment, the adhesive member AP may include a polymer derived from the resin composition described above. The adhesive member AP of an embodiment may include a polymer derived from the resin composition containing urethane (meth)acrylate oligomer having a weight average molecular weight of about 10,000 or more. The adhesive member AP of an embodiment may include a polymer derived from a resin composition which includes urethane (meth)acrylate oligomer, and further includes at least one of bifunctional (meth)acrylate monomer and a phosphate ester-based (meth)acrylate monomer, and a photoinitiator. The same description of the resin composition according to an embodiment described above may be applied to the urethane (meth)acrylate monomer, the bifunctional (meth)acrylate monomer, the phosphate ester-based (meth)acrylate monomer, and the photoinitiator.

A resin composition before a polymerization reaction is performed using a photoinitiator may have a viscosity of about 1.0 mPa·s to about 20 mPa·s at about 30° C. to about 50° C. as measured according to the JIS Z8803 method. The storage modulus at about 25° C. of the adhesive member AP of an embodiment is about $1.0 \times 10^4$ Pa to about $1.0 \times 10^5$ Pa, and the storage modulus at about 60° C. of the adhesive member AP may satisfy the following Expression 1 with respect to the storage modulus at 25° C.

$$0.9 \leq \text{storage modulus at 25° C./storage modulus at 60° C.} \leq 2.0. \qquad \text{[Expression 1]}$$

The adhesive member AP according to an embodiment has a low storage modulus value at about 25° C., and a storage modulus at about 25° C. and a storage modulus at about 60° C. may have similar values satisfying Expression 1.

The 180° peeling force of the adhesive member AP with respect to the glass substrate may be about 15N/inch or more.

In the embodiments, adhesive member AP of an embodiment may have a high elastic resilience. When the adhesive member is loaded with a shear force of 2,000 Pa (the shear force is applied to the adhesive member AP), according to an embodiment, the difference between a shear strain of the adhesive member AP about 5 seconds after the loading and a shear strain of the adhesive member AP about 300 seconds after the loading is less than 5%. When the adhesive member AP is loaded with a shear force of about 2,000 Pa (the shear force is applied to the adhesive member AP), the shear strain about 300 seconds after the loading may be ($\alpha$-5) % to ($\alpha$+5) % where the shear strain after about 5 seconds from loading is a %. In an embodiment, when the adhesive member AP is loaded with a shear force of about 2,000 Pa (the shear force is applied to the adhesive member AP), a shear strain about 5 seconds after loading and a shear strain about 300 seconds after loading may be less than 20%. When the adhesive member AP is loaded with a shear force of about 2,000 Pa (the shear force is applied to the adhesive member AP) according to an embodiment, a shear strain about 5 seconds after the loading is about 9% to about 13%, and a shear strain about 300 seconds after the loading may be more than about 4% and less than about 18%. After the adhesive member AP is loaded with a shear force of about 2,000 Pa (the shear force is applied to the adhesive member AP) according to an embodiment, a shear strain about 30 seconds after the shear force is removed may be less than about 2%. After the adhesive member AP is loaded with a shear force of about 2,000 Pa (the shear force is applied to the adhesive member AP) according to an embodiment, a shear strain about 30 seconds after the shear force is removed may be less than about 0.2%.

The adhesive member AP included in the display device DD of an embodiment may be formed by providing a liquid resin composition on a surface of the window WP or a surface of the display module DM, and UV curing the liquid resin composition provided between the window WP and the display module DM. In other examples, the adhesive member AP may be provided by UV curing a liquid resin composition in a separate process to form adhesive member AP, laminating one surface of the adhesive member AP cured in the form of an adhesive film on a surface of the window WP or on a surface of the display module DM, and attaching a surface of the window WP or a surface of the display module DM that is not attached to the other surface of the adhesive member AP.

The thickness of the adhesive member AP may be about 50 μm to about 200 μm. For example, the adhesive member AP may have the thickness of about 100 μm to about 150 μm.

Figure 8A:
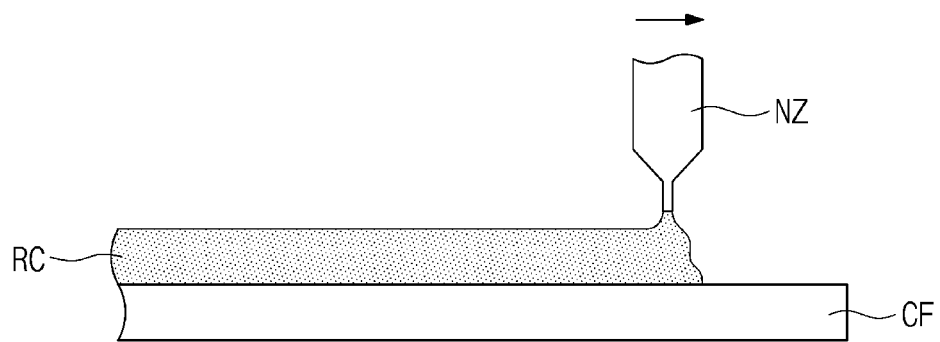
FIGS. 8A to 8C schematically illustrate a method of manufacturing an adhesive member according to an embodiment.
Figure 8B:
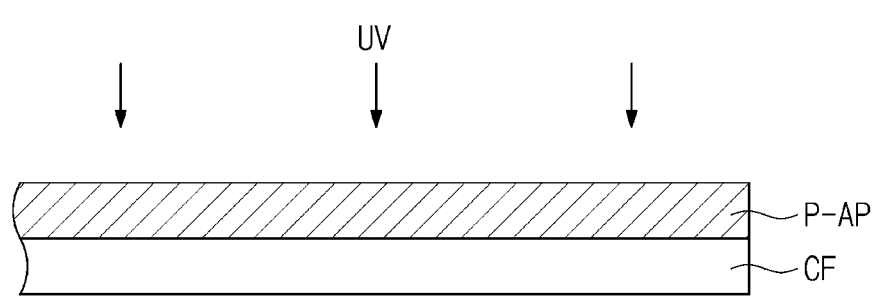
Figure 8C:
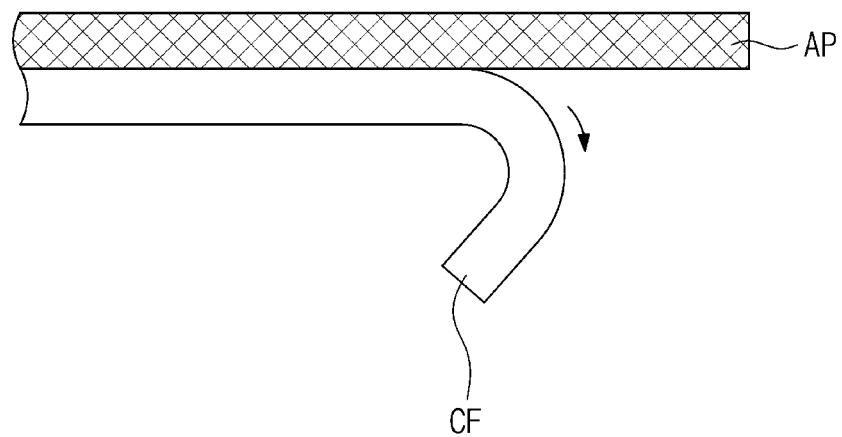

FIGS. 8A to 8C schematically illustrate a method of manufacturing an adhesive member AP according to an embodiment. FIG. 8A illustrates an operation of providing a resin composition RC for forming an adhesive member AP, FIG. 8B illustrates ultraviolet light (UV) irradiation, and FIG. 8C illustrates the removal of a carrier film CF.

Referring to FIGS. 8A to 8C, the resin composition RC of an embodiment may be provided on the carrier film CF. As the carrier film CF, for example, a polyethylene terephthalate (PET) film, and the like may be used, but the embodiments are not limited thereto. The embodiments are not limited by the carrier film CF as long as the carrier film CF may serve as a substrate for coating the liquid resin composition RC and may be easily detached from the adhesive member AP after UV curing. For example, a release treatment may be applied to one surface of the carrier film CF provided with the resin composition RC.

The resin composition RC may be provided through a method such as an inkjet printing method or a dispensing method. Since the resin composition RC of an embodiment has a viscosity value of about 1.0 mPa·s to about 20 mPa·s at about 30° C. to about 50° C., the resin composition RC may be easily discharged from a nozzle NZ or the like and be provided to maintain a constant coating thickness. The resin composition RC of an embodiment may have a viscosity value of about 1.0 mPa·s to about 20 mPa·s at about 40° C.

A preliminary adhesive member P-AP provided by coating the resin composition RC with a constant thickness may be irradiated with ultraviolet light UV. FIG. 8B illustrates that the coated preliminary adhesive member P-AP is directly irradiated with ultraviolet light UV, but the embodiments are not limited thereto. An auxiliary carrier film (not shown) may be further disposed on the preliminary adhesive member P-AP, the auxiliary carrier film (not shown) which may transmit ultraviolet light and may cover the preliminary adhesive member P-AP during the UV curing process.

After UV curing, the adhesive member AP may be formed. The adhesive member AP finally provided by removal of the carrier film CF used during the process has a storage modulus value of about $1.0 \times 10^4$ Pa to about $1.0 \times 10^5$ Pa at about 25° C., and the storage modulus at about 60° C. of the adhesive member AP may satisfy the following Expression 1 with respect to the storage modulus at about 25° C.

$$0.9 \leq \text{storage modulus at 25° C./storage modulus at 60° C.} \leq 2.0. \quad \text{[Expression 1]}$$

The adhesive member AP according to an embodiment has a low storage modulus value at about 25° C., and a storage modulus at about 25° C. and a storage modulus at about 60° C. may have similar values satisfying Expression 1.

The adhesive member AP manufactured in the steps of FIGS. 8A to 8C may be applied to the above-described display device DD. For example, a surface of the adhesive member AP may be attached to the display module DM, and thereafter, the window WP may be sequentially attached to the other surface of the adhesive member AP facing the surface of the adhesive member AP attached to the display module DM. In other examples, a surface of the adhesive member AP may be attached to a surface of the window WP that is to face the display module DM, and thereafter, the other surface of the adhesive member AP facing the surface of the adhesive member AP attached to the window WP may be attached to the display module DM, so that the adhesive member AP may be provided on the display device DD.

Figure 9A:
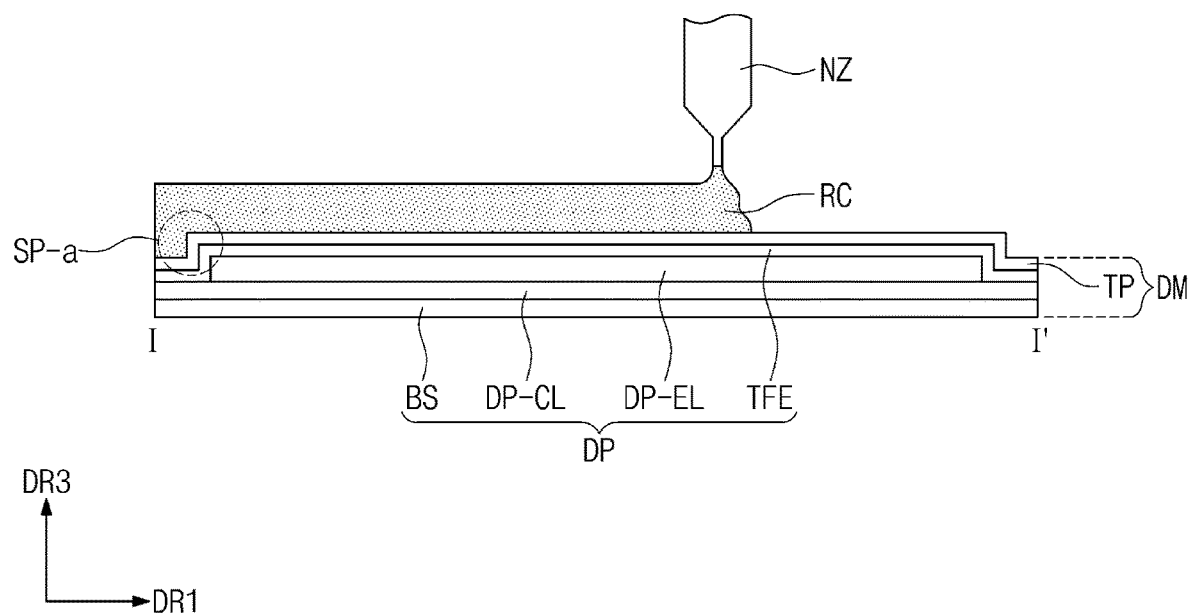
FIGS. 9A and 9B schematically illustrate a method of manufacturing an adhesive member according to an embodiment.
Figure 9B:
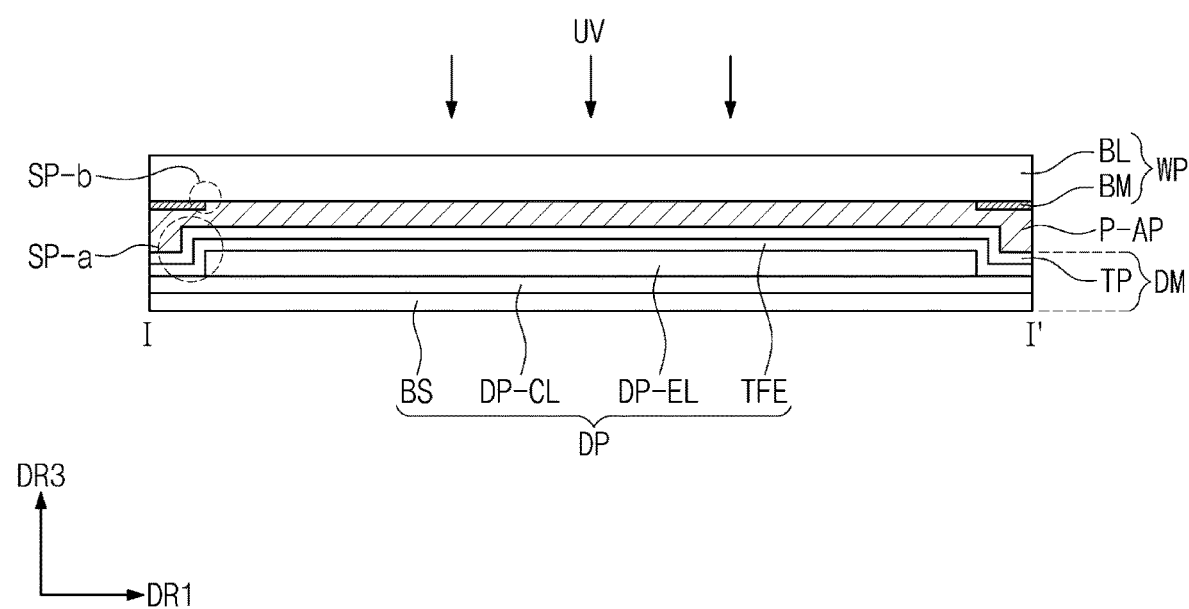

A resin composition in a liquid phase provided between the display module DM and the window WP may be cured to form the adhesive member AP. FIGS. 9A and 9B illustrate a manufacturing process of the adhesive member AP which is included in the display device DD and manufactured through a method different from the manufacturing method of the adhesive member AP described with reference to FIGS. 8A to 8C.

FIG. 9A illustrates an operation of providing a resin composition RC on the display module DM. In addition, FIG. 9B illustrates an operation in which the preliminary adhesive member P-AP formed from the resin composition RC is irradiated with ultraviolet light UV.

The resin composition RC may be provided through a method such as an inkjet printing method or a dispensing method. The resin composition RC of an embodiment has a viscosity value of about 1.0 mPa·s to about 20 mPa·s at about 25° C., so that the resin composition RC may be easily discharged from the nozzle NZ or the like, and may be provided to maintain a constant small coating thickness. The resin composition RC may have a viscosity value of about 1.0 mPa·s to about 20 mPa·s and thus be provided while covering the bent portions of a stepped portion SP-a of the display module DM. Since the resin composition RC has a low viscosity value of about 20 mPa·s or less, the resin composition RC may be filled, without a void, into bent portions such as the stepped portion SP-a. Since the resin composition RC provided through the nozzle NZ has a viscosity value of about 1.0 mPa·s or more, the resin composition RC may be uniformly coated to a predetermined thickness without flowing out of the display module DM.

The window WP may be provided on the preliminary adhesive member P-AP provided by coating the resin composition RC with a predetermined thickness. Ultraviolet light UV for curing the resin composition RC may be provided through the window WP. When the window WP is provided on the preliminary adhesive member P-AP, the resin composition RC may be filled, without a void, into a stepped portion SP-b. That is, since the resin composition RC has a low viscosity value of about 20 mPa·s or less, the preliminary adhesive member P-AP may be provided so as to cover the shape of the bent portion such as the stepped portion SP-a between the base layer BL and the printing layer BM. The preliminary adhesive member P-AP may be cured after polymerization by the provided ultraviolet light (UV) to form the adhesive member AP.

In another example from that illustrated in FIG. 9B, ultraviolet light UV may be provided to the preliminary adhesive member P-AP before the window WP is provided on the preliminary adhesive member P-AP, so that a polymerization reaction may be carried out in the resin composition RC. The amount of ultraviolet light ultraviolet (UV) irradiated may be an amount of light sufficient to completely cure the resin composition RC. In other examples, the polymerization reaction of the resin composition RC may be partially carried out on the preliminary adhesive member P-AP, and thereafter, the window WP may be covered and then the unreacted resin composition RC may be further reacted to finally form the adhesive member AP.

The display devices DD, DD-a, DD-b according to an embodiment illustrated in FIGS. 1 to 5 may each include the adhesive member AP containing a polymer derived from the resin composition of the above-described embodiment, and maintain an adhesive state between the window WP and the display module DM using the adhesive member AP without the adhesive member AP being lifted even in a folded state or a bending area.

Figure 10:
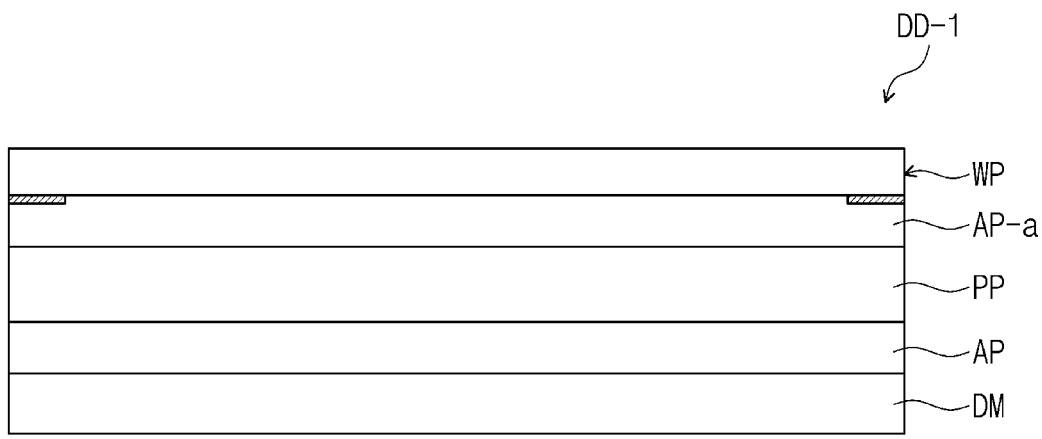
FIG. 10 is a schematic cross-sectional view of a display device according to an embodiment.

FIG. 10 is a schematic cross-sectional view illustrating a display device according to an embodiment. Hereinafter, in the description of the display device of an embodiment illustrated in FIG. 10, duplicate descriptions made with reference to FIGS. 1 to 9B will not be described again, and the description will focus on differences.

Compared to the display device DD described with reference to FIGS. 6 and 7, the display device DD-1 according to an embodiment illustrated in FIG. 10 may further include a light control layer PP and an optical adhesive layer AP-a. The display device DD-1 according to an embodiment may further include a light control layer PP disposed between the adhesive member AP and the window WP, and an optical adhesive layer AP-a disposed between the light control layer PP and the window WP.

The light control layer PP may be disposed on the display panel DP to control reflected light from the display panel DP by external light. The light control layer PP may include, for example, a polarizing layer or a color filter layer.

The optical adhesive layer AP-a may be an optically clear adhesive film (OCA) or an optically clear adhesive resin layer (OCR). The optical adhesive layer AP-a may be formed from the resin composition of an embodiment in the same manner as the adhesive member AP (refer to FIG. 7). The optical adhesive layer AP-a may include a polymer derived from resin composition containing a (meth)acryl monomer including at least one (meth)acryloyl group, a urethane (meth)acrylate oligomer having a weight average molecular weight of about 27,000 to about 50,000, and at least one photoinitiator.

The resin composition before a reaction caused by the photoinitiator may have a viscosity of about 1.0 mPa·s to about 20 mPa·s at about 30° C. to about 50° C. as measured according to the JIS Z8803 method. The optical adhesive layer AP-a according to an embodiment may have a storage modulus of about $1.0 \times 10^4$ Pa to about $1.0 \times 10^5$ Pa at about 25° C., and a storage modulus at about 60° C. may satisfy the following Expression 1 with respect to a storage modulus at about 25° C.

$$0.9 \leq \text{storage modulus at 25° C./storage modulus at 60° C.} \leq 2.0. \quad \text{[Expression 1]}$$

The optical adhesive layer AP-a according to an embodiment may have a low storage modulus value at about 25° C., and a storage modulus at about 25° C. and a storage modulus at about 60° C. may have similar values satisfying Expression 1.

The optical adhesive layer AP-a according to an embodiment may exhibit a high elastic resilience. In an embodiment, when the optical adhesive layer AP-a is loaded with a shear force of 2,000 Pa (the shear force is applied to the optical adhesive layer AP-a) according to an embodiment, the difference between a shear strain of the optical adhesive layer AP-a about 5 seconds after the loading and a shear strain of the optical adhesive layer AP-a about 300 seconds after the loading may be less than about 5%. When the optical adhesive layer AP-a is loaded with a shear force of 2,000 Pa (the shear force is applied to the optical adhesive layer AP-a), a shear strain about 300 seconds after the loading may be (α−5) % to (α+5) % where a shear strain about 5 seconds after the loading is α %. In an embodiment, when the optical adhesive layer AP-a is loaded with a shear force of 2,000 Pa (the shear force is applied to the optical adhesive layer AP-a), a shear strain about 5 seconds after the loading and a shear strain about 300 seconds after the loading may be less than about 20%. In an embodiment, when the optical adhesive layer AP-a is loaded with a shear force of 2,000 Pa (the shear force is applied to the optical adhesive layer AP-a), a shear strain about 5 seconds after the loading may be about 9% to about 13%, and a shear strain about 300 seconds after the loading may be more than about 4% to less than about 18%. After the optical adhesive layer AP-a is loaded with a shear force of 2,000 Pa (the shear force is applied to the optical adhesive layer AP-a) according to an embodiment, a shear strain about 30 seconds after the removal of the shear force may be less than about 2%. After the optical adhesive layer AP-a is loaded with a shear force of 2,000 Pa (the shear force is applied to the optical adhesive layer AP-a) according to an embodiment, a shear strain about 30 seconds after the removal of the shear force may be less than about 0.2%

The display device DD-1 of an embodiment includes an optical adhesive layer AP-a and an adhesive member AP formed from the resin composition of an embodiment. The optical adhesive layer AP-a and the adhesive member AP exhibit a low storage modulus value and have high elastic resilience, thereby preventing a lifting phenomenon from occurring at the interface between the optical adhesive layer AP-a and the adhesive member AP and achieving suitable reliability characteristics even in an operating state in which the display device DD-1 is folded or bent.

Figure 11:
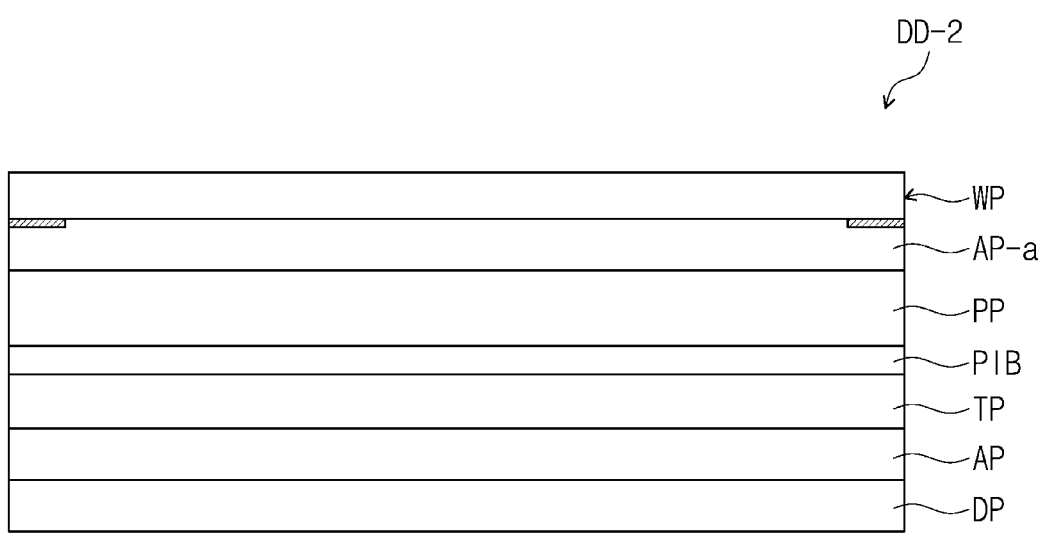
FIG. 11 is a schematic cross-sectional view of a display device according to an embodiment.

FIG. 11 is a cross-sectional view illustrating a display device according to an embodiment. Hereinafter, in the description of the display device of an embodiment illustrated in FIG. 11, duplicate description made with reference to FIGS. 1 to 10 will not be described again, and description will be made focusing on differences.

Compared to the display device DD described with reference to FIGS. 6 and 7, a display device DD-2 of an embodiment illustrated in FIG. 11 may further include a light control layer PP, an optical adhesive layer AP-a, and an interlayer adhesive layer PIB. Like the display device DD-1 of an embodiment illustrated in FIG. 10, the display device DD-2 according to an embodiment may further include a light control layer PP disposed between the adhesive member AP and the window WP, and an optical adhesive layer AP-a disposed between the light control layer PP and the window WP.

The display device DD-2 of an embodiment may be provided between the display panel DP and the input sensor TP. The input sensor TP may not be disposed directly on the display panel DP, but the display panel DP and the input sensor TP may be coupled to each other via the adhesive member AP. For example, the adhesive layer AP may be disposed between the encapsulation layer TFE (refer to FIG. 7) of the display panel DP and the input sensor TP.

The interlayer adhesive layer PIB may be provided under the light control layer PP. The interlayer adhesive layer PIB may be disposed between the input sensor TP and the light control layer PP, and may be formed of an adhesive material having suitable moisture-proofing properties. For example, the interlayer adhesive layer PIB may be formed including polyisobutylene. The interlayer adhesive layer KB may be disposed on the input sensor TP to prevent corrosion of the sensing electrodes of the input sensor TP.

The display device DD-2 of an embodiment includes an optical adhesive layer AP-a and an adhesive member AP formed from the resin composition of an embodiment. The optical adhesive layer AP-a and the adhesive member AP may exhibit a low storage modulus value and have high elastic resilience, thereby preventing a lifting phenomenon from occurring at the interface between the optical adhesive layer AP-a and the adhesive member AP and achieving suitable reliability characteristics even in an operating state in which the display device DD-2 is folded or bent.

Hereinafter, a resin composition, an adhesive member, and a display device according to the embodiments will be described in detail with reference to Examples and Comparative Examples. Examples illustrated below are provided to assist in understanding of the embodiments, and the scope of the embodiments are not limited thereto.

Example

1. Preparation of Curable Liquid Resin Composition

Resin composition of Examples were prepared according to mixing ratios shown in Table 1. Resin compositions of Comparative Examples were prepared according to mixing ratios shown in Table 2. After the constituent materials of Examples and Comparative Examples were provided to a heat-resistant shielding container at the weight ratios disclosed in Tables 1 and 2, Omnirad TPO-H (2,4,6-trimethylbenzoyl-diphenylphosphine oxide) as a photoinitiator was provided in an amount of 2 wt % with respect to the total resin composition. Thereafter, the provided materials were stirred at 100 RPM for 1 hour using a three-one motor (Shinto Scientific Co., Ltd.) at room temperature to prepare a curable liquid resin composition.

TABLE 1

| Material | Example 1 | Example 2 | Example 3 | Example 4 | Example 5 |
|---|---|---|---|---|---|
| UV-3700B | 5.3 | 5.3 | 5.2 | 5.1 | 5.1 |
| Viscoat #195 | 0.3 | 0.9 | | | |
| Viscoat #260 | | | 0.4 | 0.5 | |
| SR9050 | | | | | 2.5 |
| 4-HBA | 2.4 | 2.4 | 2.4 | 2.4 | 2.4 |
| SYA-4 | 41 | 41 | 41 | 41 | 46 |
| IDAA | 51 | 51 | 51 | 51 | 44 |

TABLE 2

| Material | Comparative Example 1 | Comparative Example 2 |
|---|---|---|
| UV-3700B | 5 | 5 |
| 8BR-950HB | 2.5 | |
| 4-HBA | 22.5 | 55 |
| SYA-4 | | |
| IDAA | 70 | 40 |

<Data on Material Used as Components of Example and Comparative Example>

Data on each component used in the Examples and Comparative Examples disclosed in Tables 1 and 2 are as follows.

UV-3700B: urethane acrylate, manufactured by Mitsubishi Chemical Co., Ltd.

Viscoat #195: 1,4-butanediol diacrylate, manufactured by Osaka Organic Chemical Industry Co., Ltd.

Viscoat #260: 1,9-nonanediol diacrylate, manufactured by Osaka Organic Chemical Industry Co., Ltd.

SR9050: 2-(methacryloyloxy)ethyl phosphate, manufactured by Arkema

4-HBA: 4-hydroxybutyl acrylate, manufactured by Osaka Organic Chemical Industry Co., Ltd.

SYA004: 10-hydroxydecyl acrylate, manufactured by Sanyu Chemical Research Institute Co., Ltd.

IDAA: Isodecyl acrylate, manufactured by Osaka Organic Chemical Industry Co., Ltd.

8BR-950HB: Polyfunctional acrylic polymer, manufactured by Daisei Fine Chemical Co., Ltd.

2. Evaluation of Physical Properties of Resin Composition and Adhesive Member Formed from Resin Composition The viscosity of the resin composition having the composition ratios in Tables 1 and 2, the storage modulus and bending reliability of the adhesive members formed from the resin compositions were measured and shown in Table 3 below. The viscosity of the resin composition, the storage modulus of the adhesive member, and the bending reliability were measured by the following method.

[Viscosity Measurements Method]

The viscosity of the resin composition described herein was measured at 40° C. according to the JIS Z8803 method, and was measured under a speed condition of 10 rpm using a viscometer TVE-25L (TOM).

[Production of Specimens for Measuring Storage Modulus]

A PET film (NP100A 100 μm thickness, manufactured by Panax) and a silicone rubber (0.5 mm thickness) with an 8 mm-diameter hole were laminated in this order on a slide glass (Slide Glass S1112, manufactured by Matsunami Glass), 29 μL of a curable liquid resin composition was dropped into the hole of the silicone rubber. Thereafter, using a UV LED lamp having a peak of 365 nm, the slide glass was irradiated with ultraviolet light such that the cumulative amount of light was 150 mJ/cm$^2$. Thereafter, a PET film (NP100A 100 μm thickness, manufactured by Panax) and a slide glass (Slide Glass S1112, manufactured by Matsunami Glass) were laminated in this order, and the resin composition was cured by irradiation with ultraviolet light so as to have a cumulative amount of light of 4000 mJ/cm$^2$ with a metal halide lamp (Conveyor-type UV irradiation device, manufactured by Eye Graphics) to thereby obtain a sample having a diameter of 8 mm.

[Storage Modulus Measurement]

The storage modulus of the sample obtained above was measured under the following conditions using a rotational rheometer (MCR302, manufactured by Anton-Paar).

Probe: 8 mm-diameter flat plate
Normal force: 1N
Measuring temperature: 25° C.

Shear strain: a shear force of 2,000 Pa was applied for 300 seconds, then released and then the sample was left for 300 seconds Shear strains of the samples 5 seconds after loading and 300 seconds after loading, and the shear force of the samples 30 seconds after release were respectively recorded.

[Preparation of Bending Reliability Test Piece]

0.6 mL of a mixed curable liquid resin composition was dropped onto a PET film (A4100 100 μm, manufactured by Toyovo Corporation), and spread uniformly using a #150 wire bar. The PET film to which the curable liquid resin composition was applied, was irradiated with ultraviolet light using a UV LED lamp having a peak of 365 nm so that the cumulative amount of light was 150 mJ/cm$^2$. The PET film irradiated with ultraviolet light and other PET film (A4100 100 μm, manufactured by Toyovo Corporation) were bonded together using a 2 kg hand roller. In the bonded state, the resin composition was cured by irradiating, from the bonded PET film side, UV light using a metal halide lamp so as to have cumulative amount of light of 4,000 mJ/cm$^2$, and a sample was obtained by being cut into 50 mm width and 200 mm length.

[Flexural Reliability Test Method]

The sample obtained above was repeatedly bent 30,000 times with a bending diameter of 3 mm at 23° C. using a durability tester (no-load U-shaped stretch tester, manufactured by Yuasa System Equipment Co., Ltd.). After the end of the test, the presence or absence of occurrence of peeling, lifting, displacement, and buckling of the test piece was visually observed, and the test pieces having no occurrence of peeling, lifting, displacement, and buckling were passed, and the test pieces having peeling, lifting, displacement, or buckling were failed.

TABLE 3

| Evaluation item | Example 1 | Example 2 | Example 3 | Example 4 | Example 5 | Comparative Example 1 | Comparative Example 2 |
|---|---|---|---|---|---|---|---|
| Viscosity (mPa · s) | 14 | 14 | 14 | 14 | 15 | 16 | 12 |
| Strain after 5 seconds (%) | 10 | 9.5 | 9.96 | 9.2 | 12.6 | 7.39 | 4.54 |
| Strain after 300 seconds (%) | 10.9 | 10.2 | 10.8 | 10 | 13.7 | 14.5 | 15.2 |
| Strain difference (%) | 0.9 | 0.7 | 0.84 | 0.8 | 1.1 | 7.11 | 10.66 |
| Strain after unloading (%) | 0.05 | 0.04 | 0 | 0.01 | 0.14 | 2.08 | 5.7 |
| Storage modulus at 25° C. (MPa) | 0.033 | 0.058 | 0.038 | 0.042 | 0.036 | 0.031 | 0.079 |
| Storage modulus at 60° C. (MPa) | 0.02 | 0.038 | 0.027 | 0.03 | 0.023 | 0.01 | 0.0228 |
| Storage modulus at 25° C./storage modulus at 60° C. | 1.7 | 1.5 | 1.4 | 1.4 | 1.6 | 3.1 | 3.5 |
| Bending reliability | pass | pass | pass | pass | pass | fail | fail |

Referring to the results in Table 3, it may be seen that resin compositions in Examples 1 to 5 have a low viscosity of 20 mPa·s or less. The resin compositions of Examples 1 to 5 have low-viscosity properties and may thus be used to form a thin, uniform coating film. In Examples 1 to 5, a urethane (meth)acrylate oligomer having a molecular weight of 10,000 or more was used in an amount of 1 wt % to 15 wt %, and less than 1 wt % of a bifunctional (meth)acrylate monomer was used with respect to the total amount of the resin composition, or 1 wt % to 10 wt % of a phosphate ester-based (meth)acrylate monomer was used. In Examples 1 to 5, the resin composition containing a combination of the materials above had a similar storage modulus value at 25° C. and 60° C. even after photocuring, and had a small difference of less than 5% between a shear strain after 5 seconds from loading and a shear strain after 300 seconds from loading when a shear force of 2,000 Pa is applied. The resin compositions of Examples 1 to 5 had a small difference in storage elastic modulus at each temperature and high elastic resilience. In the samples using the resin composition of an embodiment, defects such as peeling, lifting, displacement, and buckling may not occur in the bending reliability test.

In the case of Comparative Example 1 and Comparative Example 2, compared to the resin composition of Example, the resin composition did not contain a bifunctional (meth) acrylate monomer or a phosphate ester-based (meth)acrylate monomer. Therefore, unlike the resin composition of the Example, in the resin composition of Comparative Example, the difference between a shear strain after 5 seconds from loading and a shear strain after 300 seconds from loading was as high as 7% or more, and a shear strain after 30 seconds from removal of the shear force was 2% or higher, and the ratio between the storage modulus at 25° C. and the storage modulus at 60° C. was 3 or higher. As a result, it may be confirmed that the resin composition of Comparative Example was failed due to defects such as peeling, lifting, displacement, and buckling in the bending reliability test.

The resin composition of an embodiment may have a viscosity of 1.0 mPa·s to 20 mPa·s before curing and exhibit advantageous properties for forming a thin, uniform coating film, and may have low-viscosity properties to exhibit suitable coating properties even in uneven surfaces. The adhesive member of an embodiment formed from the resin composition of an embodiment has similar storage modulus values between room temperature (25° C.) and high temperature (60° C.), and the difference between a shear strain after 5 seconds from loading and a shear strain after 300 seconds from loading has a small value of less than 5%, and a shear strain after removal of the load has a small value of 2% or less. The display device of an embodiment including an adhesive member formed through the resin composition of an embodiment may exhibit good reliability because there is no peeling or lifting of the adhesive member in the bent portion, and the display device may exhibit desirable operational reliability because peeling between the adhesive member and neighboring members does not occur even in a bending or folding operation state.

The resin composition of an embodiment has low-viscosity, and thus may exhibit appropriate coating properties for substrates having various shapes.

Once the resin composition is photocured to form an adhesive member, the adhesive member of an embodiment may have a low storage modulus, a small change in storage modulus at each temperature, and may have a high elastic resilience when shear force is applied. These properties of the adhesive member are suitable for flexible display devices.

The display device of an embodiment includes an adhesive member having a low storage modulus and a high elastic resilience, thereby improving reliability in various operating states.

Although embodiments have been described, it is understood that the disclosure should not be limited to these embodiments but various changes and modifications can be made by one of ordinary skilled in the art within the spirit and scope of the disclosure as hereinafter claimed.

Accordingly, the technical scope of the disclosure is not limited to the content described in the detailed description of the specification, but should be defined by the claims.

What is claimed is:

1. A resin composition comprising:
a urethane (meth)acrylate oligomer, wherein
when the resin composition is cured with an ultraviolet light and loaded with a shear force of about 2,000 Pa, a difference between a shear strain of the cured resin composition about 5 seconds after the loading and a shear strain of the cured resin composition about 300 seconds after the loading is less than about 5%, and a shear strain of the cured resin composition about 30 seconds after the shear force is removed from the cured resin composition is less than about 2%.

2. The resin composition of claim 1, wherein the resin composition has a viscosity of about 20 mPa·s or less at about 30° C. to about 50° C.

3. The resin composition of claim 1, wherein the shear strain of the cured resin composition about 5 seconds after the loading is less than about 20%.

4. The resin composition of claim 1, wherein the urethane (meth)acrylate oligomer is included in an amount of about 1 wt % to about 15 wt % with respect to the total amount of the resin composition.

5. The resin composition of claim 1, wherein the cured resin composition has a storage modulus at about 25° C. of about $1.0\times10^4$ Pa to about $1.0\times10^5$ Pa.

6. The resin composition of claim 5, wherein the cured resin composition has a storage modulus at about 60° C. such that a value of the storage modulus of the cured resin composition at about 25° C. divided by the storage modulus of the cured resin composition at about 60° C. is greater than or equal to 0.9 and less than or equal to 2.0.

7. The resin composition of claim 1, wherein the urethane (meth)acrylate oligomer has a weight average molecular weight of about 10,000 to about 50,000.

8. The resin composition of claim 1, further comprising:
a bifunctional (meth)acrylate monomer,
wherein the bifunctional (meth)acrylate monomer is included in an amount of less than about 1 wt % with respect to the total amount of the resin composition.

9. The resin composition of claim 1, further comprising:
a phosphate ester-based (meth)acrylate monomer,
wherein the phosphate ester-based (meth)acrylate monomer is included in an amount of about 1 wt % to about 10 wt % with respect to the total amount of the resin composition.

10. The resin composition of claim 1, further comprising:
an organic solvent,
wherein the organic solvent is included in an amount of less than about 1 wt % with respect to the total amount of the resin composition.

11. An adhesive member comprising:
a polymer derived from a resin composition including a urethane (meth)acrylate oligomer and having a viscosity of about 20 mPa·s or less at about 30° C. to about 50° C., wherein
when the adhesive member is loaded with a shear force of about 2,000 Pa, a difference between a shear strain of the adhesive member about 5 seconds after the loading and a shear strain of the adhesive member about 300 seconds after the loading is less than about 5%, and
a shear strain of the adhesive member about 30 seconds after the shear force is removed from the adhesive member is less than about 2%.

12. The adhesive member of claim 11, wherein the resin composition comprises a bifunctional (meth)acrylate monomer or a phosphate ester-based (meth)acrylate monomer.

13. The adhesive member of claim 11, wherein the shear strain of the adhesive member about 5 seconds after the loading is less than about 20%.

14. A display device comprising:
a display panel;
a window disposed on the display panel; and
an adhesive member disposed between the display panel and the window, wherein
the adhesive member is derived from a resin composition including a urethane (meth)acrylate oligomer, when the adhesive member is loaded with a shear force of about 2,000 Pa, a difference between a shear strain of the adhesive member about 5 seconds after the loading and a shear strain of the adhesive member about 300 seconds after the loading is less than about 5%, and a shear strain of the adhesive member about 30 seconds after the shear force is removed from the adhesive member is less than about 2%.

15. The display device of claim 14, wherein the adhesive member has a thickness of about 50 μm to about 200 μm.

16. The display device of claim 14, further comprising:
an input sensor disposed on the display panel, wherein the adhesive member is disposed between the display panel and the input sensor or disposed between the input sensor and the window.

17. The display device of claim 16, wherein
the display panel comprises:
   a display element layer; and
   an encapsulation layer disposed on the display element layer, the input sensor is disposed on the encapsulation layer, and the adhesive member is disposed on the input sensor.

18. The display device of claim 14, wherein the adhesive member is formed by curing the resin composition on a surface of the window or on a surface of the display panel.

19. The display device of claim 14, wherein
the display device comprises at least one folding area, and
the at least one folding area has a radius of curvature of about 5 mm or less.

20. The display device of claim 14, further comprising:
a light control layer disposed between the adhesive member and the window; and
an optical adhesive layer disposed between the light control layer and the window, wherein the optical adhesive layer includes a polymer derived from the resin composition.

* * * * *